United States Patent
Refaat et al.

(10) Patent No.: US 12,040,586 B2
(45) Date of Patent: Jul. 16, 2024

(54) DYNAMIC, THERMALLY-ADAPTIVE CUBOID CRYSTAL MOUNT FOR END-PUMPED CONDUCTIVELY COOLED SOLID STATE LASER APPLICATIONS

(71) Applicant: UNITED STATES OF AMERICA AS REPRESENTED BY THE ADMINISTRATOR OF NASA, Washington, DC (US)

(72) Inventors: Tamer F. Refaat, Hampton, VA (US); Mulugeta Petros, Newport News, VA (US); Upendra N. Singh, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 638 days.

(21) Appl. No.: 16/794,522

(22) Filed: Feb. 19, 2020

(65) Prior Publication Data
US 2020/0266599 A1     Aug. 20, 2020

Related U.S. Application Data
(60) Provisional application No. 62/807,422, filed on Feb. 19, 2019.

(51) Int. Cl.
*H01S 3/042*     (2006.01)
*H01S 3/02*      (2006.01)
(Continued)

(52) U.S. Cl.
CPC ............ *H01S 3/042* (2013.01); *H01S 3/025* (2013.01); *H01S 3/0405* (2013.01);
(Continued)

(58) Field of Classification Search
CPC ........ H01S 3/042; H01S 3/025; H01S 3/0405; H01S 3/0602; H01S 3/0606;
(Continued)

(56) References Cited

U.S. PATENT DOCUMENTS

| | | | | |
|---|---|---|---|---|
| 2004/0165625 | A1* | 8/2004 | Momiuchi | H01S 3/025 372/34 |
| 2008/0037603 | A1* | 2/2008 | Kano | H01S 3/025 372/40 |
| 2012/0160856 | A1* | 6/2012 | Armstrong | G02F 1/3501 220/592.01 |

OTHER PUBLICATIONS

R. Aggarwal et al., "Measurement of Thermos-optic Properties of Y3Al5O12, Lu3Al5O12, YAlO3, LIYF4, LiLuF4, BaY2F8, KGd(WO4)2, and KY(WO4)2 Laser Crystals in the 80-300 K Temperature Range", J. Appl. Phys., Nov. 22, 2005, Article No. 103514, vol. 98, Issue 10.
(Continued)

*Primary Examiner* — M. A. Golub-Miller
(74) *Attorney, Agent, or Firm* — M. Bruce Harper; Robin W. Edwards; Trent J. Roche

(57) ABSTRACT

A dynamic, thermally-adaptive cuboid laser crystal mount is provided that is suitable for use with end-pumped, conductively-cooled solid state lasers. Various embodiments may provide a mount for supporting a cuboid rod host crystal for an end-pumping solid state laser. Various embodiments may solve laser crystal stress problems typically experienced in end-pumped solid state lasers. Various embodiments may also provide access to the crystal end surfaces for pumping and enable and maintain sturdy alignment of the crystal with continuous and uniform surface contact between the mount and the crystal. Various embodiments of mounts may provide a compact conductive cooling configuration compatible with any heat sink reservoir, controlling and maintaining a stable crystal temperature, thus avoiding thermally induced
(Continued)

mechanical stresses. Various embodiment mounts may thereby further extend the fracture threshold of the laser crystal.

20 Claims, 6 Drawing Sheets

(51) Int. Cl.
  *H01S 3/04* (2006.01)
  *H01S 3/06* (2006.01)
  *H01S 3/08* (2023.01)
  *H01S 3/0941* (2006.01)
(52) U.S. Cl.
  CPC .......... *H01S 3/0602* (2013.01); *H01S 3/0606* (2013.01); *H01S 3/0612* (2013.01); *H01S 3/08072* (2013.01); *H01S 3/09415* (2013.01)
(58) Field of Classification Search
  CPC .............. H01S 3/0612; H01S 3/09415; H01S 3/08072; H01S 3/0407
  See application file for complete search history.

(56) References Cited

OTHER PUBLICATIONS

S. Chenais et al., "On Thermal Effects in Solid-state Lasers: The Case of Ytterbium-doped Materials." Progress in Quantum Electronics, 2006, pp. 89-153, vol. 30, Issue 4.

T. Refaat et al., "Evaluation of an Airborne Triple-pulsed 2 pm IPDA Lidar for Simultaneous and Independent Atmospheric Water Vapor and Carbon Dioxide Measurements," Applied Optics, Feb. 20, 2015, pp. 1387-1398, vol. 54, Issue 6.

M. Petros et al., "Development of an Advanced Two-micron Triple-pulse IPDA Lidar for Carbon Dioxide and Water Vapor Measurements," 28th International Laser Radar Conference (ILRC), 2017, Bucharest, Romania, Jun. 25-30, 2017, published through EPJ Web of Conferences Apr. 13, 2018, Article No. 01009, vol. 176.

U. Singh et al., "Airborne Lidar for Simultaneous Measurement of Column CO2 and Water Vapor in the Atmosphere," Proc. SPIE 10006, Oct. 24, 2016, Lidar Technologies, Techniques, and Measurements for Atmospheric Remote Sensing XII, 1000602, Edinburgh, UK.

\* cited by examiner

DYNAMIC, THERMALLY-ADAPTIVE CUBOID CRYSTAL MOUNT FOR END-PUMPED CONDUCTIVELY COOLED SOLID STATE LASER APPLICATIONS

CROSS-REFERENCE TO RELATED PATENT APPLICATION(S)

This patent application claims the benefit of and priority to U.S. Provisional Patent Application 62/807,422, filed on Feb. 19, 2019, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Solid state lasers are suitable for many industrial and scientific applications that require high energy, high beam quality, and monochromatic pulsed radiation. One example of such applications of solid states lasers is atmospheric remote sensing.

In a solid state laser, the gain medium is one or more rare earth elements that are doped into a host crystal. Host crystals come in cubic, tetragonal, and orthorhombic classes. The yttrium aluminum garnet (YAG) class crystal is cubic where the sides of the unit cell are configured as an $a=b=c$ structure. Yttrium, lithium fluoride (YLF) is a tetragonal class crystal with side configuration of $a=b\neq c$. Yttrium, orthoaluminate (YALO) is an orthorhombic class where $a\neq b\neq c$ [1-2].

The gain medium is a critical element in the solid state laser system, which can define the quality of the emitted beam. Any thermal, mechanical, or structural stress on the crystal can severely compromise the performance of the solid state laser. These stresses can result in distorting the beam of the solid state laser and/or compromising output energy of the solid state laser, and in severe cases can cause crystal fracture.

BRIEF SUMMARY OF THE INVENTION

Laser mounts of the present approach extend to various embodiments that provide a dynamic, thermally-adaptive cuboid laser crystal mount suitable for use with end-pumped, conductively-cooled solid state lasers. These embodiments may provide a solution to laser crystal stress problems typically experienced in current end-pumped solid state lasers. Embodiments of the mounts may provide access to the crystal end surfaces for pumping. Embodiments of such mounts may enable sturdy placement of the crystal to maintain alignment, continuous and uniform surface contact between the mount and the crystal, and provide a compact conductive cooling configuration compatible with any heat sink reservoir. Various embodiment mounts may control and maintain a stable (or steady state) crystal temperature by adjusting the mount temperature, for example, through the cooling media temperature setting. Various embodiment mounts may thus avoid thermally induced mechanical stresses. Various embodiments may also extend the fracture threshold of the laser crystal.

Various embodiments may provide a mount for supporting a cuboid rod host crystal for an end-pumping solid state laser, the mount comprising: a rigid fixed structure; a fixed L-shape block; and a spring suspended L-shape block suspended by two or more springs, wherein the spring suspended L-shape block is held in continuous physical contact with a cuboid rod host crystal supported between the fixed L-shape block and the spring suspended L-shape block by spring action of the two or more springs against the rigid fixed structure and the spring suspended L-shape block before, during and after end-pumping.

Various embodiments may provide an end-pumping solid state laser system, comprising: a cuboid rod host crystal; and a mount supporting the cuboid rod host crystal such that end surfaces of the cuboid rod host crystal are accessible for end-pumping and lasing, wherein the mount comprises: a rigid fixed structure; a fixed L-shape block; and a spring suspended L-shape block suspended by two or more springs, and wherein the spring suspended L-shape block is held in continuous physical contact with the cuboid rod host crystal supported between the fixed L-shape block and the spring suspended L-shape block by spring action of the two or more springs against the rigid fixed structure and the spring suspended L-shape block before, during and after end-pumping and lasing.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 2A illustrates the cuboid rod host crystal in a normal cold state and FIG. 2B illustrates the cuboid rod host crystal in a pumped hot state.

DETAILED DESCRIPTION OF THE INVENTION

Figure 1:
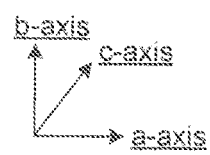
FIG. 1 illustrates a cuboid rod host crystal according to various embodiments.
Figure 1:
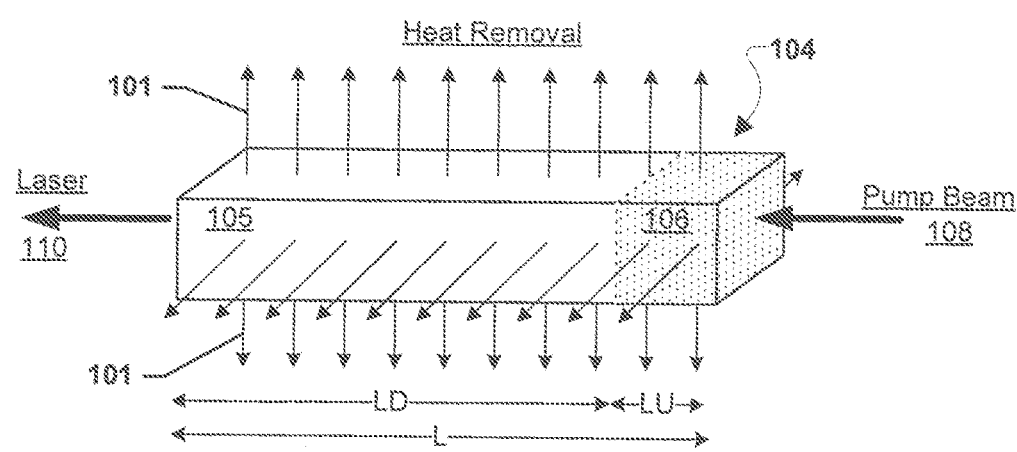

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In solid state lasers, energy can be pumped into a host crystal to cause a laser transition in the host crystal thereby resulting in stimulated emission and optical amplification. Optically pumped solid state lasers can leverage different pumping configurations, such as end-pumping, side-pumping, etc. In an end-pumping configuration, the pump beam is absorbed coaxially with the produced laser and the host rod (i.e., rod formed of the host crystal) major axis. Compared to side-pumping, end-pumping results in enhanced laser efficiency. The characteristics of the laser output can depend on several factors, such as the pump absorption efficiency, the overlap of the laser and the pump mode volume, and the quantum defect. Quantum defect becomes important if the separation of the pump wavelength and the lasing wavelength is large. For example, if a laser gain medium is pumped with 780 nanometers (nm) to produce laser emission at 2050 nm, the high quantum defect limits the maximum extractable energy, thus converting 62% of the pump energy into heat.

Heat generation and dissipation impact the temperature distribution inside the host crystal. Crystal heating and temperature gradients are major problems in designing high quality laser systems. For example, temperature gradients cause spatial variation in refractive index within the crystal leading to thermal lensing and birefringence. As another example, with the crystal being confined in a mount, heating can result in thermal expansion that causes stresses from the mount leading to fractures in the crystal. To minimize this thermal expansion problem, some previous laser designs increase thermal conductance and reduce thermal capacity. However, such previous laser designs can result in major optical failures, and consequential loss of application resulting in waste of mission costs and efforts. While the laser crystal stress problem is often analyzed, it has not previously been sufficiently addressed to a point of a solution for end-pumped solid state lasers.

Various embodiments may provide solutions to laser crystal stress problems in end-pumped solid state lasers. Various embodiments may provide a crystal mount design configured for end-pumping solid state lasers. In various embodiments, the mount may be configured for use with cuboid laser crystals operating in a high pump density environment which may be required for efficient high energy lasers. Various embodiment mounts may provide access to the crystal end surfaces for pumping. Various embodiment mounts may enable sturdy placement of the crystal to maintain alignment. Various embodiment mounts may enable continuous and uniform surface contact between the mount and the crystal to be maintained. Various embodiment mounts may provide a compact conductive cooling configuration compatible with any heat sink reservoir. Various embodiment mounts may avoid thermally induced mechanical stresses. Various embodiment mounts may extend the fracture threshold of the laser crystal. Various embodiment mounts may control and maintain a stable (or steady state) crystal temperature by adjusting the mount temperature, for example, through the cooling media temperature setting.

Various embodiments may include configuring a crystal rod to have one or more selected characteristics. Various embodiments may include configuring a mount structure to support a crystal rod configured to have one or more selected characteristics.

Figure 2B:
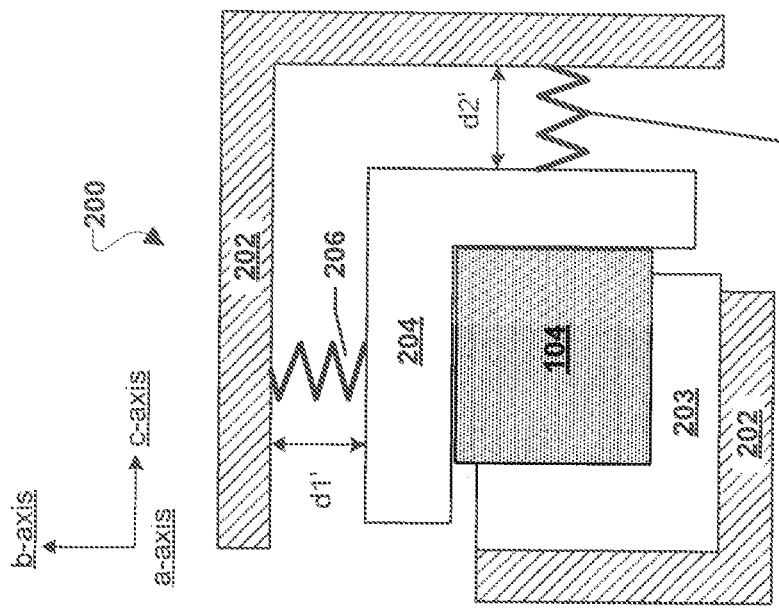
FIGS. 2A and 2B are conceptual illustrations of an embodiment laser crystal mount supporting a cuboid rod host crystal.

FIG. 1 illustrates a cuboid rod host crystal 104 according to various embodiments. The cuboid rod host crystal 104 may be elongated in the direction parallel to a direction a pump beam 108. The pump beam 108 will be incident on the cuboid rod host crystal 104 when the cuboid rod host crystal 104 is supported in a mount structure, such as the embodiment mount structures described herein. That same direction may be the direction a laser 110 may propagate from the cuboid host crystal 104 when stimulated emission and optical amplification is achieved. In this manner, end-pumping and lasing may be achieved through the end surfaces of the cuboid rod host crystal 104. Heat 101 may radiate from the cuboid rod host crystal 104 out of the radial surfaces, i.e., the surfaces other than the end surface at which the pump beam 108 enters the cuboid rod host crystal 104 and the end surface the laser 110 exits the cuboid rod host crystal 104. Said another way, the end surfaces may be the two planar surfaces of the cuboid host crystal 104 that are perpendicular to the a-axis as illustrated in FIG. 1, while the radial surfaces may be the other four planar surfaces of the cuboid host crystal 104 that are perpendicular to either the b-axis or the c-axis, as illustrated in FIG. 1. In this manner, the cuboid host crystal 104 may have four flat radial surfaces and two flat end surfaces. In some embodiments, the cuboid rod host crystal 104 may have a square cross section perpendicular to the propagation direction of the laser 110 (i.e., along the a-axis). End-pumping and lasing may be achieved through the square end surfaces, while the radial surfaces are used for heat removal. The square cross section perpendicular to the propagation of the laser beam 110 may insure almost uniform thermal radial distribution along the absorption path length. The cuboid host crystal 104 may have a length "L" in the direction along the laser propagation, for example along the a-axis as illustrated in FIG. 1. It should be understood that the orientation of the cuboid rod host crystal 104 relative to the a-axis, b-axis, and c-axis in FIGS. 1-2B are merely examples of crystal mounting configurations. As an alternative example, the beam propagation direction may be along the b-axis instead of the a-axis.

In some embodiments, the cuboid host crystal 104 may have one or more doped portions and one or more undoped portions. A doped portion may be a portion in which lasing media (i.e., a gain medium) is present, such as concentrations of rare earth elements (e.g., neodymium (Nd), thulium (Tm), holmium (Ho), etc.) An undoped portion may be a portion in which lasing media is not present, i.e., a portion of the crystal without a gain medium. In some embodiments, the cuboid host crystal 104 may be configured such that one or more portions of the cuboid host crystal 104 are undoped, such as an undoped section 106. In some embodiments, the cuboid host crystal 104 may be configured such that one or more portions of the cuboid host crystal 104 are a doped section 105. The cuboid host crystal 104 may be configured such that the doped section 105 may have a length "LD" and undoped section 106 may have a length "LU". In various embodiments, the doped section 105 length "LD" may be a greater percentage of the total length of the cuboid host crystal 104 "L" than the length "LU" of the undoped section 106. While FIG. 1 illustrates the cuboid host crystal 104 having one doped section 105 and one undoped section 106, the cuboid host crystal 104 may have more than one doped section 105 and/or more than one undoped section 106. For example, two undoped sections 106 may be present at each end of the cuboid host crystal 104 with a doped section 105 there between. As another example, no undoped sections 106 may be present in the cuboid host crystal 104.

In various embodiments, the length of the crystal (i.e., "L" illustrated in FIG. 1) and the length of the lasing medium doping concentration sections 105 (i.e., "LD" in FIG. 1) may be selected to maximize the absorption of the pump radiation. Extending the length "LD" along the laser propagation direction may increase the radial surface area to increase thermal conductance between crystal and mount interfaces. In various embodiments, an undoped section 106 of the cuboid host crystal 104 may be added at either or both ends of the cuboid host crystal 104 to reduce thermal effects at the pumping surface, where the highest temperature occurs. As the pumping energy may not be absorbed in the undoped section 106, there will be no heat load in this region. Cooling this undoped section 106 with the rest of the cuboid host crystal 104 may result in dissipating the highest heat generated at the pumping surface (i.e., the surface at which the pump beam 108 is incident to the cuboid host crystal 104). The advantages of cuboid host crystal 104 versus cylindrical rod may be to maintain firm thermal contact through flat surfaces rather than curved surfaces. Cylindrical rods are unsuited for conductive cooling, where the curvature of the radial surface of the curved rod may change into elliptical shape due to different thermal expansion coefficients along different axes.

Figure 2A:
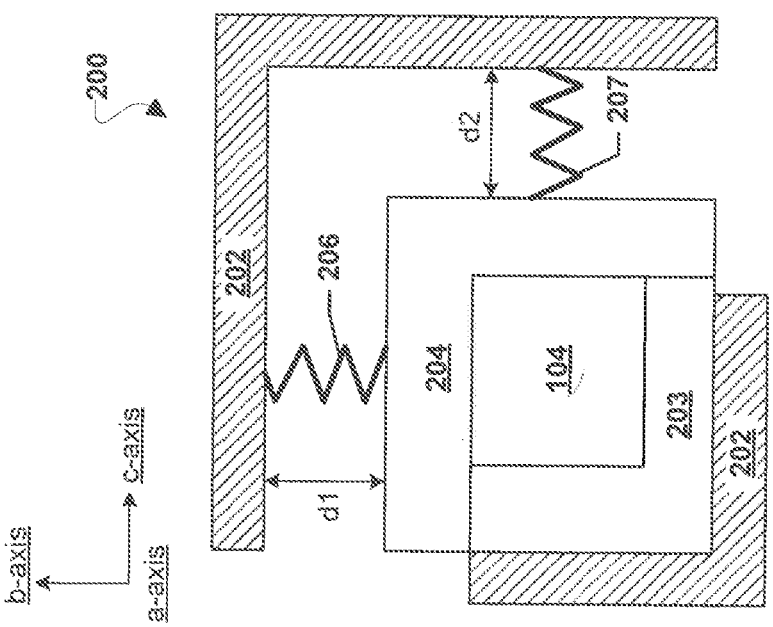

FIGS. 2A and 2B are conceptual cross-section illustrations of an embodiment laser crystal mount 200 supporting a cuboid rod host crystal 104. With reference to FIGS. 1-2B, FIG. 2A illustrates the cuboid rod host crystal 104 in a normal cold state and FIG. 2B illustrates the cuboid rod host crystal 104 in a pumped hot state. In the pumped hot state, the cuboid rod host crystal 104 may expand asymmetrically to a volume larger than the volume in the normal cold state. FIGS. 2A and 2B illustrate the cuboid rod host crystal 104 viewed along the a-axis, i.e., along the direction of laser propagation.

In various embodiments, the laser crystal mount 200 may include rigid fixed structures 202. The rigid fixed structures 202 may be portions of the mount 200 that are not configured to move. In various embodiments, laser crystal mount 200 structure may include a fixed L-shape block 203 used to hold two radial surfaces of the cuboid rod host crystal 104. Another, spring (i.e., springs 206 and 207) suspended, L-shape block 204 is mounted, opposite to the first L-shape block 203, over the other two radial surfaces of the cuboid rod host crystal 104. The fixed L-shape block 203 may be held rigidly in place, for example by directly contacting the rigid fixed structures 202. In some embodiments, the fixed L-shape block 203 may be an integral portion of the rigid fixed structure 202 itself. The springs 206 and 207 may be disposed between the rigid fixed structures 202 and the spring suspended L-shape block 204. While single springs 206 and 207 are illustrated in FIGS. 2A and 2B, one or more springs may be used to suspend the spring suspended L-shape block 204.

The springs 206 and 207 may be configured to exert a spring force away from the surface of the rigid fixed structures 202 which the springs 206 and 207 respectively contact. The springs 206 and 207 are merely examples of one type of elastic device that may be used in the various embodiments to suspend L-shape block 204 and/or provide a force away from the surface of the rigid fixed structures 202. As such, the springs 206 and 207 may be substituted for any such elastic device without departing from the scope of the various embodiments, such as air bags, rubber bands, or any other elastic object that may store mechanical energy. The two perpendicular spring loads exerted by the springs 206 and 207 upon the L-shape block 204 are used to maintain continuous physical contact between the flat surfaces of the cuboid rod host crystal 104 and the flat sides of the mount, specifically the inner flat surfaces of the L-shape blocks 203 and 204. The spring action on one direction is opposed by a reaction from the fixed surface of the L-shape block 203 maintaining the cuboid rod host crystal 104 in position. For each spring 206, 207, the design of the compression force may be adjusted such that it may be constrained by the deformation limit of the crystal material forming the cuboid rod host crystal 104 and away from the fracture limit at the operating temperature (i.e., the temperature of the cuboid rod host crystal 104 while lasing). This insures free thermal expansion of the cuboid rod host crystal 104 in two dimensions with two different expansion coefficients, while maintaining position and continuous contact with heat sink that is the L-shape blocks 203 and 204. In the normal cold state illustrated in FIG. 2A the spring 206 may be extended to a distance d1 and the spring 207 may be extended to a distance d2. As the pump beam 108 is applied to the cuboid rod host crystal 104, the cuboid rod host crystal 104 may expand entering the pumped hot state illustrated in FIG. 2B. The expansion of the cuboid rod host crystal 104 may push on the L-shape block 203 and 204. As the L-shape block 204 is not rigidly retained in place (in comparison to L-shape block 203 held by the rigid fixed structure 202), the L-shape block 204 may push against springs 206 and 207 thereby compacting them to a shorter length d1' and d2', respectively, in comparison to lengths d1 and d2, respectively. As illustrated in FIG. 2B, the expansion of the cuboid rod host crystal 104 upon heating may create gaps (or spaces) between the L-shape blocks 203, 204. While illustrated as uniform in FIG. 2B, the gaps (or spaces) between the L-shape blocks 203, 204 may be different sizes due to different heat expansion of the cuboid rod host crystal 104 between the b-axis and c-axis.

In various embodiments, the L-shape blocks 203, 204 may also deliver cooling, and/or temperature control, to the cuboid rod host crystal 104 by providing a heat sink path to a thermal reservoir. The L-shape blocks 203 and 204 may be manufactured using a hard material with high thermal conductivity, such as copper (Cu), silver (Ag), or gold (Au). Additionally, the L-shape blocks 203 and 204 may be manufactured using a material with relatively less thermal conductivity, such as aluminum (Al) or iron (Fe). In some embodiments, a relatively soft material with high thermal conductivity, such as indium (In), may be used as padding to buffer the interface between the cuboid rod host crystal 104 and the L-shape blocks 203 and 204 surfaces. The relatively soft material with high thermal conductivity may be in any form, such as a foil. A coolant medium, such as water or any other coolant medium with relatively high thermal capacity, may act to transfer the heat from the cuboid rod host crystal 104 to a sink by generating a high temperature gradient between the cuboid rod host crystal 104 and the sink through the mount 200. This may be achieved by cooling down the mount 200, or controlling its temperature, to insure fast heat transfer. A water chiller or a heat pipe with radiator are examples for coolant mediums and thermal reservoirs or systems suitable for use in the various embodiments.

The L-shape blocks 203 and 204 may be configured such that the end surfaces of the cuboid rod host crystal 104 are accessible for pumping and lasing when the cuboid rod host crystal 104 is supported in the mount 200. The L-shape blocks 203 and 204 may be configured such that sturdy placement of the cuboid rod host crystal 104 is achieved in the mount 200. When a cuboid rod host crystal 104, is placed in the mount 200, the L-shape blocks 203 and 204 may maintain continuous and uniform surface contact with the crystal 104 for fast heat dissipation. The mount 200 may provide compact conductive cooling configuration compatible with any heat sink reservoir. The movement of the L-shape block 204 via the springs 206 and 207 may avoid thermally-induced mechanical stresses by accommodating the dynamics of the thermal expansion and contraction of the cuboid rod host crystal 104. In this manner, the mount 200 may extend the fracture threshold of laser crystals.

Figure 3A:
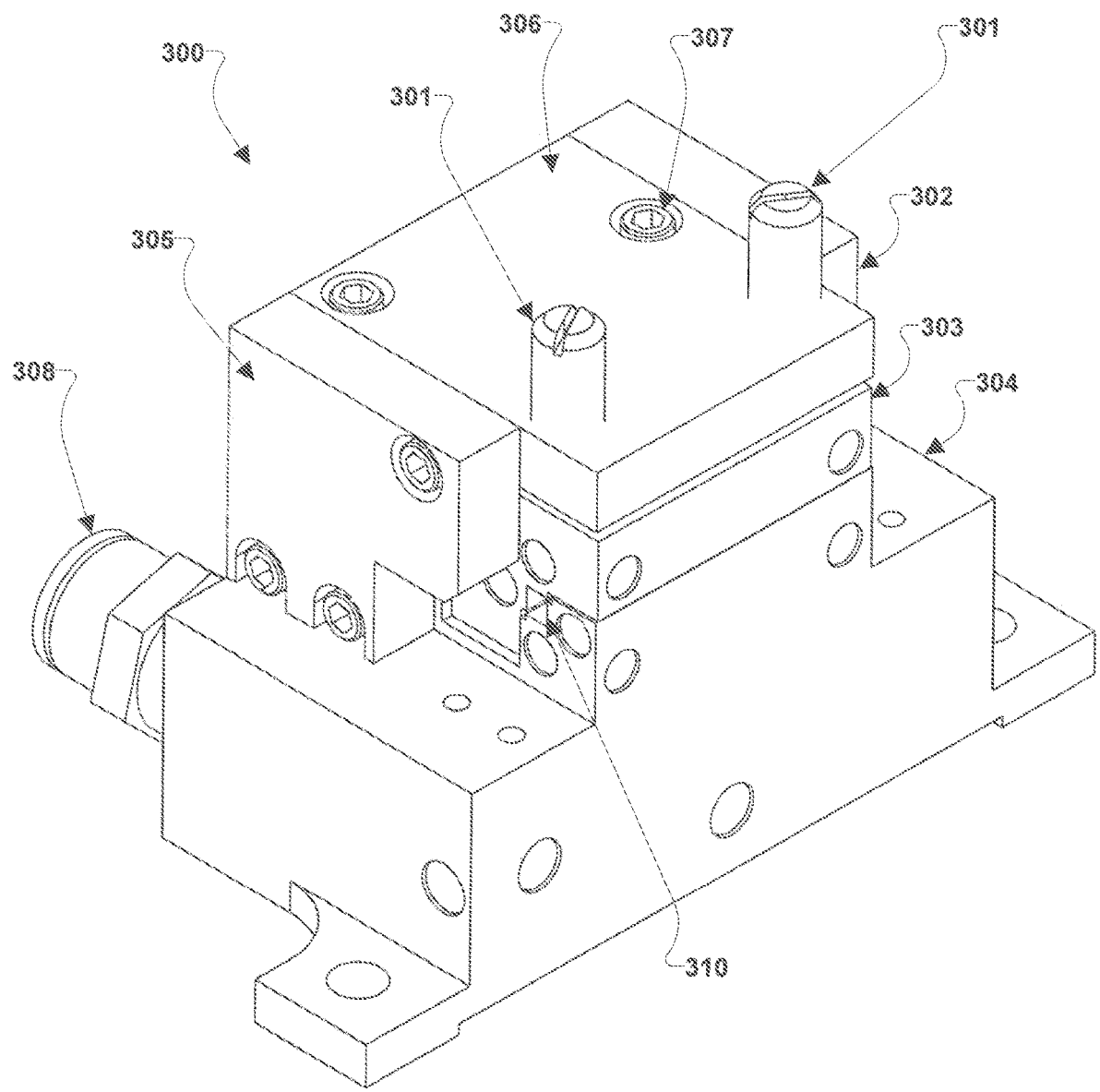
FIGS. 3A-E illustrate an example embodiment laser crystal mount.
Figure 3B:
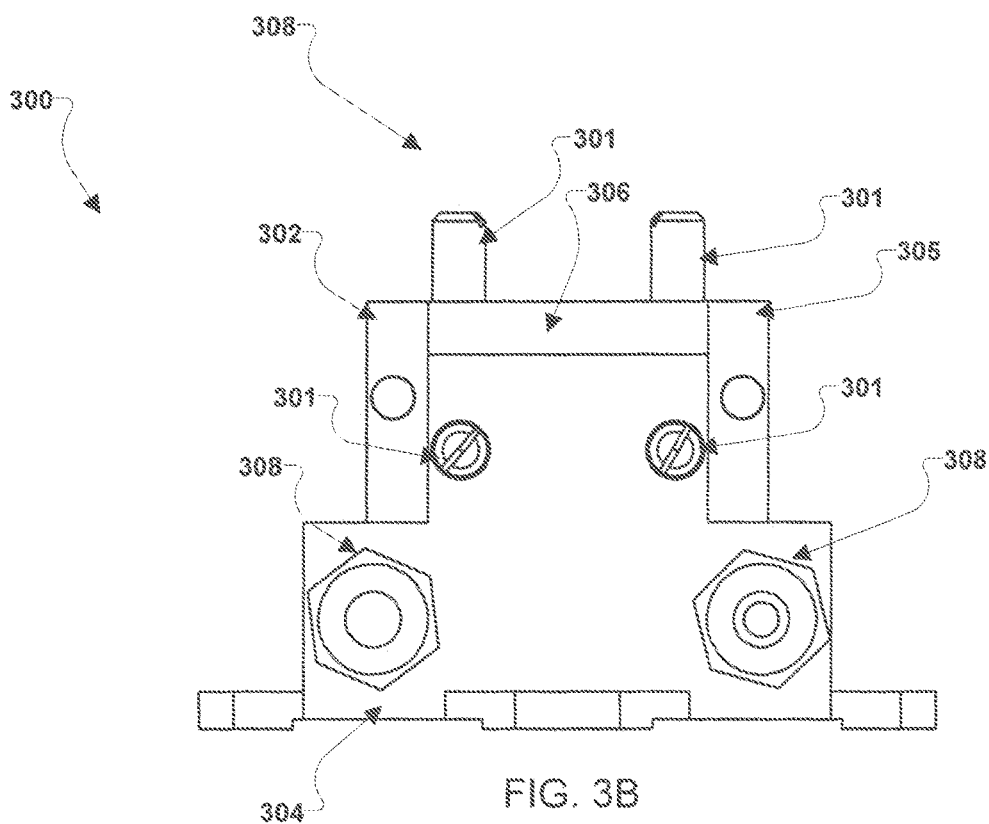
Figure 3C:
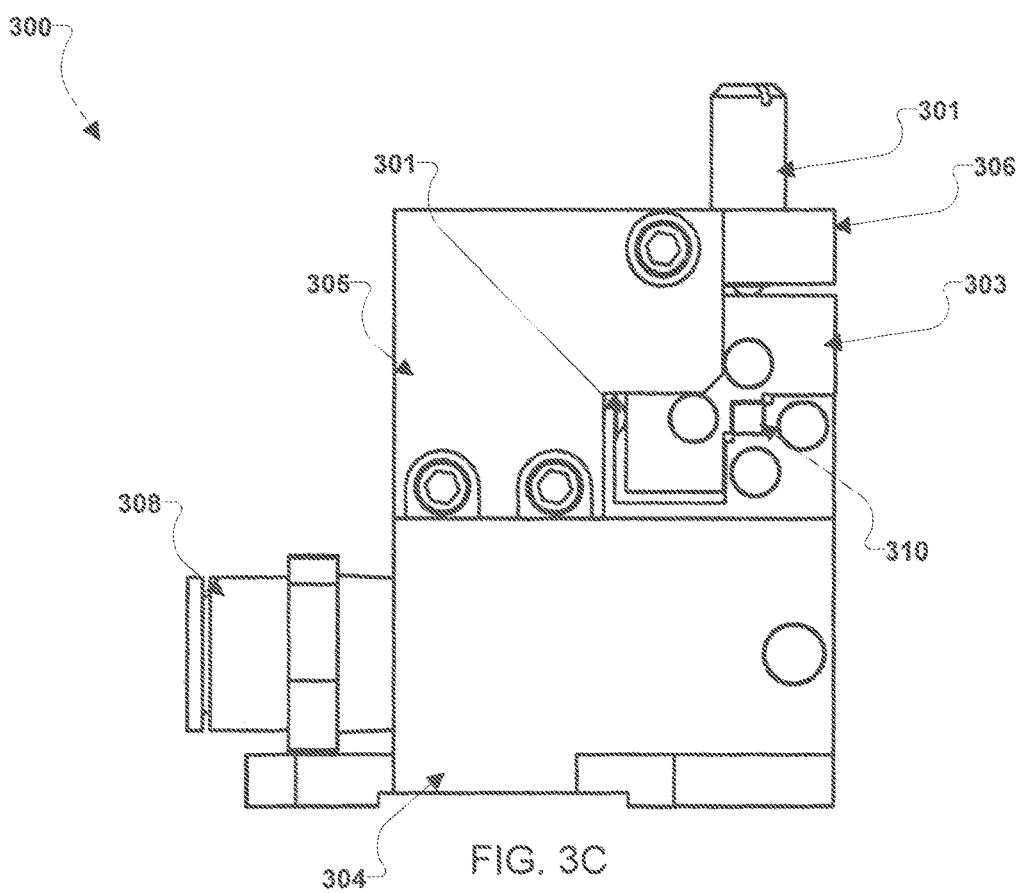
Figure 3D:
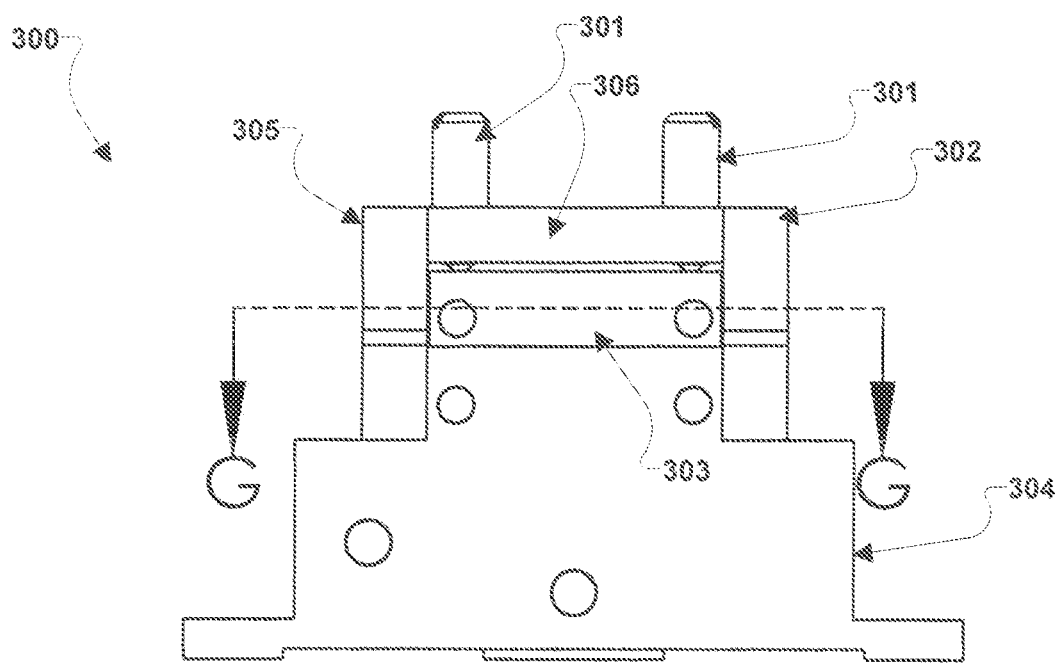
Figure 3E:
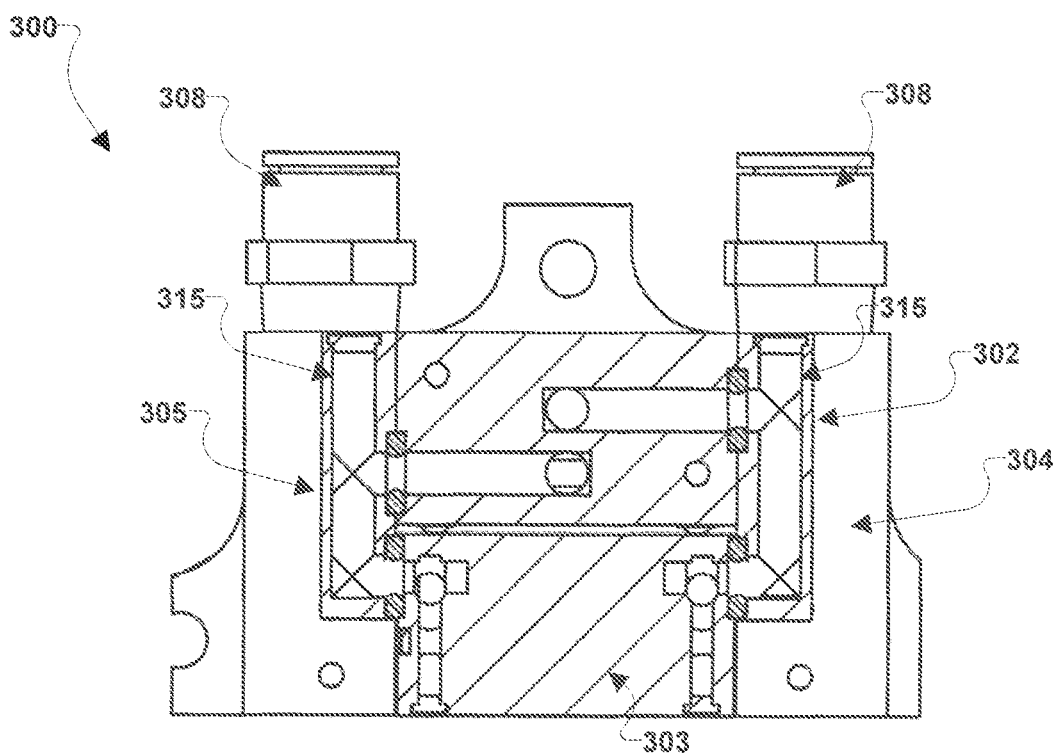

FIGS. 3A-E illustrate an example embodiment laser crystal mount 300. FIG. 3A illustrates a perspective view, FIGS. 3B-3D illustrate side views, and FIG. 3E illustrates a cross sectional view of the mount 300 along the cross section line G-G of FIG. 31). With reference to FIGS. 1-3E, the laser crystal mount 300 may be configured to form a passage 310 for supporting and securing a cuboid rod host crystal, such as the cuboid rod host crystal 104. The passage 310 may be formed between an L-shape portion of a base 304 that may operate in a similar manner as the fixed L-shape block 203 described above and an L-shape portion of a pressure plate 303 that may operate in a similar manner as the spring suspended L-shape block 204 described above. Spring plungers 301, such as four spring plungers 301, may exert spring force against the pressure plate 303 in a similar manner as the springs 206 and 207 described above. A top plate 306 may secure the pressure plate—303 in place relative to the base 304. The mount 300 may include fluid cooling passages 315 that may be formed by grooves and/or passages cut in fluid transfer plates 302 and 305. The fluid cooling passages 315 (FIG. 3E) may receive cooling fluid from one of tube fittings 308 and provide fluid out from the mount 300 via the other tube fitting 308. Various fasteners, such as lugs 307, may secure the top plate 306 to the base 304 and/or fluid transfer plates 302 and 305. The pressure plate 303 may not be rigidly affixed to the base 304, fluid transfer plates 302 and 305, or top plate 306. Rather, the pressure plate 303 may move against the spring plungers 301 in a similar manner as the spring suspended L-shape block 204 described above when a cuboid rod host crystal, such as the cuboid rod host crystal 104, expands while secured in the passage 310 of the mount 300. The passage 310 may be configured to support a 2 millimeter (mm)×2 mm×15 mm cuboid rod host crystal, such as the cuboid rod host crystal 104, in the normal cold state. The passage 310 may be configured such that the end surfaces of the cuboid rod host crystal, such as the cuboid rod host crystal 104, are accessible for pumping and lasing when the cuboid rod host crystal is supported in the mount 300. The passage 310 may be configured such that sturdy placement of the cuboid rod host crystal, such as the cuboid rod host crystal 104, is achieved in the mount 300. When a cuboid rod host crystal, such as the cuboid rod host crystal 104, is placed in the passage 310, the base 304 and the pressure plate 303 may maintain continuous and uniform surface contact between the mount 300 and the crystal for fast heat dissipation. The base 304 and the pressure plate 303 of the mount 300 may provide compact conductive cooling configuration compatible with any heat sink reservoir. The movement of the pressure plate 303 of the mount 300 via the spring plungers 301 may avoid thermally-induced mechanical stresses by accommodating the dynamics of the thermal expansion and contraction of the cuboid rod host crystal. In this manner, the mount 300 may extend the fracture threshold of laser crystals.

Figure 4:
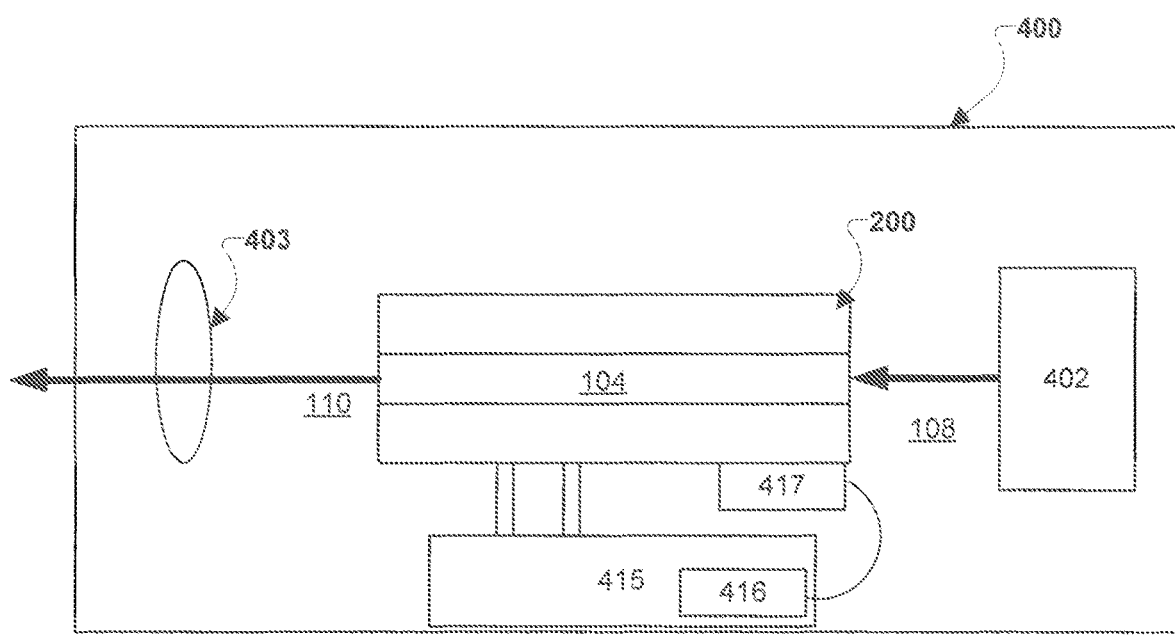
FIG. 4 is an example block diagram of a solid state laser system including an embodiment mount.

FIG. 4 is an example block diagram of a solid state laser system 400 including an embodiment mount, such as mount 200 or 300. For ease of illustration, FIG. 4 is illustrated and discussed with reference to the mount 200, but the mount 300 or any other embodiment mount may be substituted for the mount 200 without departing from the scope of the various embodiments. With reference to FIGS. 1-4, the system 400 may include the mount 200 supporting the cuboid rod host crystal 104. A pump source 402, such as a diode laser 402, may generate the pump beam 108. The laser 110 output from the cuboid rod host crystal 104 may be focused by one or more optics systems 403 and output from the solid state laser system 400 for various applications, such as for use in a lidar system. The system 400 may include a cooling system 415 that may be configured to control the temperature of the mount 200 and/or the cuboid rod host crystal 104 and transfer heat from the cuboid rod host crystal 104 to a sink before, during and after end-pumping. As an example, the cooling system 415 may be a water cooling unit using a chiller to pump water to and/or from the mount 200 (e.g., via the tube fittings 308 and fluid cooling passages 315 described above). The cooling system 415 may include a temperature controller 416 connected to one or more temperature sensors 417 monitoring the temperature of the mount 200, the cuboid rod host crystal 104, and/or the temperature of the cooling media (e.g., pumped water). The temperature controller 416 may monitor the temperature of the mount 200, the cuboid rod host crystal 104, and/or the temperature of the cooling media (e.g., pumped water) via inputs from the one or more temperature sensors 417, and may adjust operation of the cooling system 415 to maintain a stable (or steady state) cuboid rod host crystal 104 temperature by adjusting the mount temperature, for example, through increasing or decreasing the cooling media temperature setting and/or cooling media flow rate. In this manner, the cooling system 415 may be used for cuboid rod host crystal 104 temperature control via heat dump through the mount 200. As a specific example, the cooling system 415 may be a chiller and water cooling using the chiller may be used for cuboid rod host crystal 104 temperature control and heat dump through the mount 200. In this manner, the mount 200 can be used to control the temperature of the cuboid rod host crystal 104, not only to cool it. For example, the mount 200 may dump the heat loss from the cuboid rod host crystal 104 and maintain cuboid rod host crystal 104 temperature at a specific value, such as 20 degrees Celsius. As an example, this dump of the heat loss from the cuboid rod host crystal 104 may be achieved by the temperature controller 416 using a set temperature of the cooling system 415 (e.g., a chiller set temperature) to control the cooling media temperature (e.g., the water temperature), which thereby may maintain the cuboid rod host crystal 104 temperature at a fixed steady-state value.

Recently, an airborne 2-micrometer (μm) triple pulse integrated path differential absorption (IPDA) lidar instrument was developed at NASA Langley Research Center using an embodiment laser crystal mount, specifically a laser crystal mount 300. This IPDA lidar instrument is designed to measure the column content of atmospheric $H_2O$ and $CO_2$ simultaneously and independently. This is achieved using a solid state laser transmitter that generates three successive high-energy pulses, seeded at three different wavelengths. These pulses are transmitted through the atmosphere. The three pulses are 200 microseconds (μs) apart and repeated at 50 Hertz (Hz) with mean 10-15 millijoule (mJ) per pulse per shot (30 to 45 mJ total energy per shot). The transmitter is based on yttrium lithium fluoride (YLF) host crystal, co-doped with holmium (Ho) and thulium (Tm) as the active lasing mediums.

Pulsed end-pumping of the crystal is achieved using 792 nanometer (nm) laser diodes. The 792 nm pump excites the Tm, which pumps the Ho. The Tm long lifetime results in Ho repopulation after every Q-switch pulse. Thus, the energies for the second and third pulse are extracted by simply reopening the Q-switch. The transmitter exhibits 4% electrical to optical efficiency with a pump power of 200 Watt. This indicates that 192 Watt of the consumed power is converted to heat. The length of the YLF host crystal is 1 cm with 2×2 mm$^2$ pump surface area. This indicates the challenge of dissipating 48 MWatt/m$^2$ heat density in 20 ms, while maintaining continuous (for an average of 3 hrs) lasing operation in terms of optical, mechanical, thermal stabilities during airborne operation.

The mount 300 used in the IPDA lidar instrument was manufactured using copper (Cu) with indium (In) foil warp padding the crystal. Water cooling using a chiller was used for crystal temperature control and heat dump through the mount 300. Optically, YLF is a uniaxial crystal, where the indices of refraction of the c-axis of the crystal is different from the a-axis and b-axis, and so is the index of refraction of crystal. As a result the index of refraction changes as a function of temperature and the coefficient of linear thermal expansion (CTE) in the c and b-axis are different. The CTE of YLF around room temperature is 10 and 14 parts per million (ppm) per 1 Kelvin (K) change in temperature (ppm/K) for the a and c-axis, respectively. If the crystal mount is rigid, the crystal expands further in the c-axis than the b-axis causing thermally induced stress that may lead to fracture. Rather than a rigid mount, the embodiment mount 300 provided a method of mounting the crystal with the appropriate spring load to avoid the undesirable effects of crystal stress.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A mount for supporting a cuboid rod host crystal of an end-pumped solid state laser, the mount comprising:
   a rigid fixed structure;
   a fixed L-shape block; and
   a spring suspended L-shape block that is suspended by at least two springs contacting the spring suspended L-shape block and the rigid fixed structure, the at least two springs comprising at least a first spring and at least a second spring;
   the fixed L-shape block and the spring suspended L-shaped block are configured to adaptably confine a cuboid rod host crystal directly therebetween;
   wherein, before, during and after end-pumping:
   the spring suspended L-shape block is held in continuous physical contact with the cuboid rod host crystal by both of a first spring action of the first spring against the rigid fixed structure and a second spring action of the second spring against the rigid fixed structure; and
   the first spring action and the second spring action exert spring loads that are perpendicular to each other upon the spring suspended L-shape block;
   wherein the mount is capable of supporting a cuboid rod host crystal made of a material selected from a group consisting of cubic, tetragonal or orthorhombic class crystal structure.

2. The mount of claim 1, wherein the fixed L-shape block and the spring suspended L-shape block are comprised of a rigid material selected from the group consisting of copper, aluminum, iron, silver, or gold.

3. The mount of claim 1, further comprising a padding on surfaces of the fixed L-shape block and the spring suspended L-shape block that contact the cuboid rod host crystal when supported in the mount,
   wherein:
   the fixed L-shape block and the spring suspended L-shape block are comprised of a first material and the padding is comprised of a second material;
   the first material and the second material both have a high thermal conductivity; and
   the first material is a rigid material and the second material is a soft material.

4. The mount of claim 3, wherein the second material is indium.

5. The mount of claim 1, further comprising a cooling system configured to control the temperature and transfer heat from the cuboid rod host crystal to a heat sink during end-pumping.

6. The mount of claim 5, wherein the cooling system is a water chiller or a heat pipe with radiator.

7. The mount of claim 1, wherein the at least two springs are configured such that thermal expansion or contraction of the cuboid rod host crystal causes movement of the at least two springs.

8. The mount of claim 1, wherein the mount is configured to control a temperature of the cuboid rod host crystal to a fixed steady-state value before, during and after end-pumping.

9. An end-pumped solid state laser system, comprising:
   a cuboid rod host crystal;
   a mount supporting the cuboid rod host crystal such that end surfaces of the cuboid rod host crystal are accessible for end-pumping and lasing,
   wherein the mount comprises:
   a rigid fixed structure;
   a fixed L-shape block; and
   a spring suspended L-shape block suspended by at least two springs contacting the spring suspended L-shape block and the rigid fixed structure, the at least two springs comprising at least a first spring and at least a second spring,
   the cuboid rod host crystal is supported between the fixed L-shape block and the spring suspended L-shaped block;
   wherein, before, during and after end-pumping:
   the spring suspended L-shape block is held in continuous physical contact with the cuboid rod host crystal by both of a first spring action of the first spring against the rigid fixed structure and a second spring action of the second spring against the rigid fixed structure; and
   the first spring action and the second spring action exert spring loads that are perpendicular to each other upon the spring suspended L-shape block; wherein the mount is capable of supporting a cuboid rod host crystal made of a material selected from a group consisting of cubic, tetragonal or orthorhombic class crystal structure.

10. The end-pumping solid state laser system of claim 9, wherein the fixed L-shape block and the spring suspended L-shape block are comprised of a rigid material selected from the group consisting of copper, aluminum, iron, silver, or gold.

11. The end-pumping solid state laser system of claim 10, wherein the mount further comprises a padding on surfaces of the fixed L-shape block and the spring suspended L-shape block that contact the cuboid rod host crystal,
wherein:
the fixed L-shape block and the spring suspended L-shape block are comprised of a first material and the padding is comprised of a second material;
the first material and the second material both have a high thermal conductivity; and
the first material is a rigid material and the second material is a soft material.

12. The end-pumping solid state laser system of claim 11, wherein the second material is indium.

13. The end-pumping solid state laser system of claim 9, wherein the mount further comprises a cooling system configured to transfer heat from the cuboid rod host crystal to a heat sink during end-pumping and lasing.

14. The end-pumping solid state laser system of claim 13, wherein the cooling system is a water chiller or a heat pipe with radiator.

15. The end-pumping solid state laser system of claim 9, wherein the cuboid rod host crystal comprise a doped section and an undoped section.

16. The end-pumping solid state laser system of claim of claim 15, wherein the undoped section comprises an end surface receiving a pump beam during end-pumping and lasing.

17. The end-pumping solid state laser system of claim of claim 15, wherein the doped section comprises one or more rare earth elements.

18. The end-pumping solid state laser system of claim of claim 17, wherein the one or more rare earth elements comprise one or both of thulium and holmium.

19. The end-pumping solid state laser system of claim of claim 9, wherein the at least two springs are configured such that thermal expansion or contraction of the cuboid rod host crystal causes movement of the spring suspended L-shape block that is suspended by the at least two springs.

20. The end-pumping solid state laser system of claim of claim 9, further comprising a temperature controller configured to control a temperature of the cuboid rod host crystal to a fixed steady-state value before, during and after end-pumping.

* * * * *